June 6, 1944.  C. F. JOHNSTON  2,350,619
PISTON EXPANDER AND STABILIZER
Filed Dec. 16, 1939  2 Sheets-Sheet 1
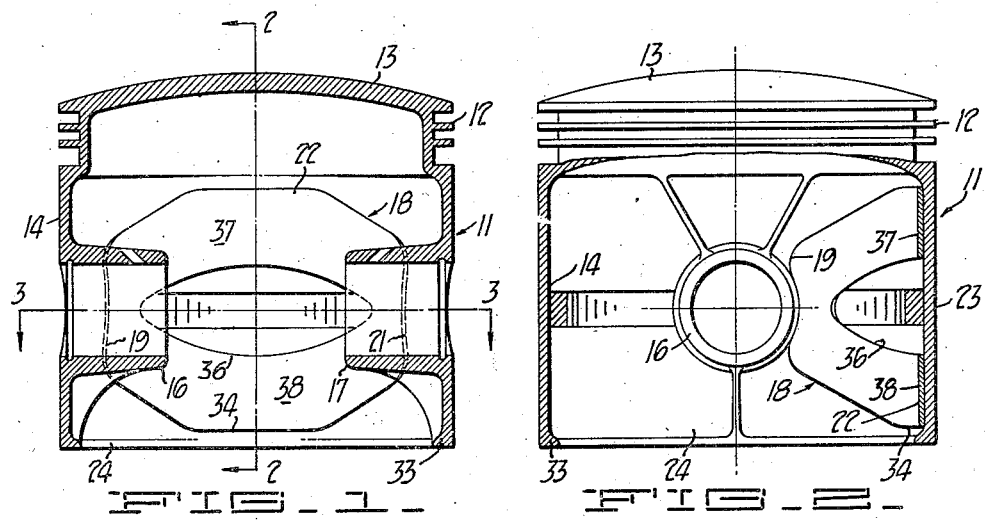
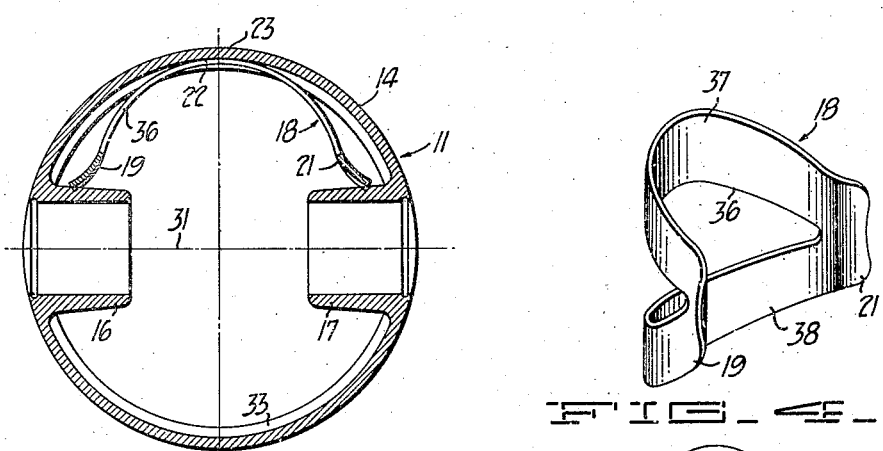
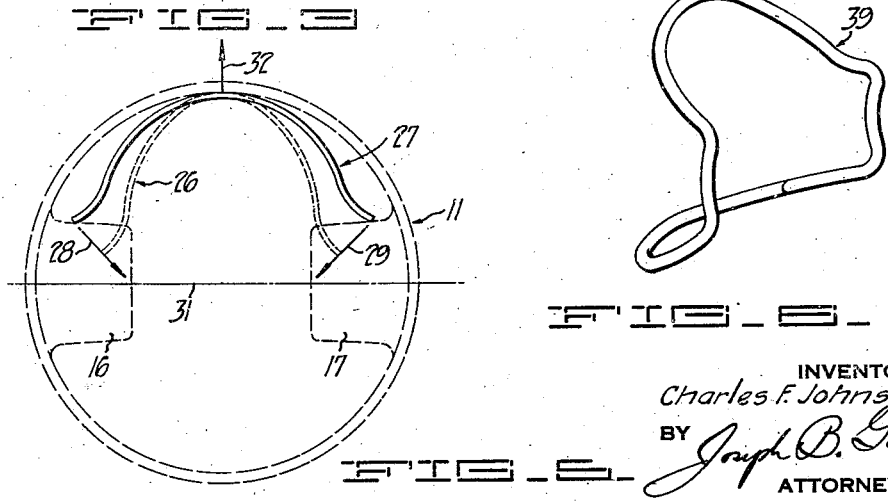
INVENTOR
Charles F. Johnston
BY
ATTORNEY June 6, 1944. C. F. JOHNSTON 2,350,619
PISTON EXPANDER AND STABILIZER
Filed Dec. 16, 1939 2 Sheets-Sheet 2

INVENTOR
Charles F. Johnston
BY Joseph P. Gardner
Attorney

UNITED STATES PATENT OFFICE 2,350,619

PISTON EXPANDER AND STABILIZER

Charles F. Johnston, Oakland, Calif.

Application December 16, 1939, Serial No. 309,517

3 Claims. (Cl. 309—12)

The invention relates to devices used in conjunction with pistons for internal combustion engines or the like for expanding the piston into proper engagement with the cylinder wall and for holding the piston during its reciprocal movement against rocking in the cylinder.

As is understood, in an internal combustion engine the pistons are rather closely fitted in the engine cylinders in order to properly position the piston rings for efficient sealing of the piston in the cylinder and to prevent rocking of the piston about its wrist pin connection to the connecting rod to eliminate or at least minimize the action commonly known as "piston slap." As is also well understood the principal wear in the cylinder occurs at portions of the circumferential wall thereof at right angles to the aligned axes of the wrist pin bearings of the piston. Thus after some wear in the engine the cylinders enlarge in the aforementioned direction into an oval or elliptical cross section. To better accommodate pistons to this change in shape of the cylinder, pistons are frequently formed non-circular in cross section with the greater dimension of the piston at right angles to the axis of the wrist pin bearings. Such pistons are frequently termed cam shape pistons. Another expedient has been widely and successfully used for causing an expansion of the piston so as to better conform to the worn shape of the cylinder, viz. internally positioned resilient spring members commonly known as piston expanders. These expanders are of different types and are generally positioned in the skirt portion of the piston. One of the more successful types of such expanders is one which is supported on the wrist pin bearing bosses and which engages a portion of the piston wall circumferentially intermediate the bosses to provide an outward expansion force against such wall portion. This type of expander has in each instance applied a similar expansion force to the bosses against which the expander was compressed. The result of the combined expansion force against the side wall of the piston and against the bearing bosses disposed at circumferential positions at substantially ninety degrees on opposite sides of the wall portion has been to generally expand the entire circumference of the piston with a more or less greater expansion at the wall part engaged by the expander. As will be understood, it is substantially impossible to produce any substantial expansion of the piston circumference, particularly in the case of solid skirt pistons where the circumference comprises a solid endless ring. In this type of piston therefore the aforementioned type of expander has not produced fully satisfactory results. Furthermore as above mentioned, the worn shape of the cylinder is not circular but rather is oval or cam shape, and the desired result to be obtained is the expansion or elongation of the piston on a plane at right angles to the axis of the bearing bosses so that the tendency of the piston to rock about this axis may be eliminated. While it may be that relatively large and powerful expanding devices within the interior of a solid skirt piston would provide the necessary amount of expansion, the use of such devices is substantially precluded by reason of the limited amount of space available within the interior of the piston without the interference of the connecting rod and because it is undesirable for dynamic reasons to overweight the piston. In accordance with the present invention and as a principal object thereof, I provide an expander of the character described which when operatively inserted within the piston will provide a contracting force between the wrist pin bosses tending to draw these opposed portions of the piston together and which will simultaneously bear outwardly against a part of the piston wall located circumferentially between the bosses whereby a distorting action is produced as contrasted to a straight expansion force heretofore and with the result that the cross sectional shape of the piston may be moved from a circular to an oval form with a minimum amount of resilient force. By reason of this novel action I may use a relatively light weight spring member which may be readily positioned in the interior of the piston skirt to occupy a minimum amount of space and which will assume a position entirely spaced from and without possible interference with the connecting rod of the piston.

Another object of the present invention is to provide a piston expander of the character described which will maintain a better alignment of the wrist pin bearings than expanders heretofore.

A further object of the invention is to provide an expander of the character above which will provide a full longitudinal expansion of the piston skirt and which will be fully resilient and will yieldably conform to the varying diameters of the worn cylinder wall.

A still further object of the invention is to provide an expander of the character above which will be positively locked in position in the piston.

Another means which has been resorted to for overcoming piston slap is the provision of a movable piston wall section either of metal or hard wood or the like which is supported by the piston for radial reciprocation and which is urged to an outwardly extended position by a suitable spring mechanism supported at the inside of the piston. Such means when used alone is frequently effective for the purpose of stabilizing the piston but has the disadvantage of moving the piston exclusively to one side of the cylinder without causing the piston to uniformly circumferentially engage the cylinder as originally fitted, as is provided by an efficient piston expander. In accordance with the present invention and as a further object thereof, I provide a structure which may embody the advantageous features of both the movable piston wall section and the skirt expander and which functions to simultaneously urge the movable piston wall member radially outward against the cylinder wall and to expand the skirt of the piston to obtain a more uniform engagement of the piston with the cylinder wall.

As another object of the invention the expander device herein may be quickly and readily installed through the crank case opening of an internal combustion engine and positioned directly in place within the interior of the pistons of the engine without necessitating the removal of the pistons from the engine or a disconnection of the piston from the connecting rod.

As another object of the invention the present expander device may be universally used with all existing forms of pistons including cast iron pistons, alloy slotted pistons, and thin wall steel pistons.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a longitudinal sectional view of a piston with the expander of my invention operatively positioned therein.

Figure 2 is a sectional view, partly in elevation, taken on the line 2—2 of Figure 1.

Figure 3 is a transverse sectional view of the piston and expander taken on the line 3—3 of Figure 1.

Figure 4 is a perspective view of the expander.

Figure 5 is a top view of the expander indicating its stressed and unstressed positions in the piston.

Figure 6 is a perspective view of a modified form of the expander.

Figure 7:
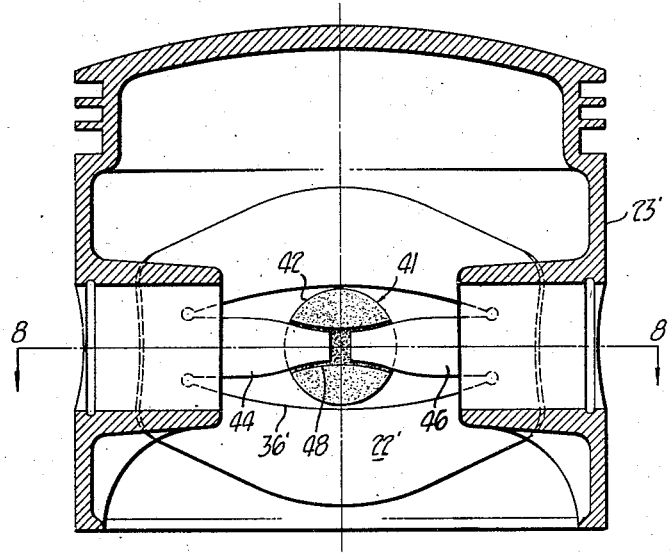
Figure 7 is a vertical sectional view of a piston with a further modified form of the expander.

The piston expander and stabilizer of the present invention consists briefly of a resilient member which is adapted to be sprung into the interior of a piston so as to engage the wrist pin bosses of the piston and the skirt of the piston at a portion thereof circumferentially intermediate the bosses and which will provide in its inserted stressed position for a contraction of the diametrical distance between the bosses and a diametrical expansion of the engaged skirt portion. In a modified form of the invention (see Figures 7 and 8) the stabilizer and expander means consists of the combination of a movable piston wall member supported for radial displacement at a circumferential part of the piston between the bosses and a resilient member sprung between the wall member and the bosses and the skirt of the piston for urging the wall member to an outward position against the wall of the engine cylinder and simultaneously distorting the piston skirt as above described.

With reference more particularly to the accompanying drawings, the device of the present invention is shown in conjunction with a piston 11 of the type used in an internal combustion engine and the like and having a ring retaining section 12 adjacent the head end 13 thereof and a longitudinal depending side wall or skirt 14. The piston herein illustrated is of the solid or continuous skirt type, although as will be more fully hereinafter understood, the present device may be used with slitted skirts if desired. Formed on the interior of the skirt 14 is a pair of internally projecting diametrically opposed wrist pin bearing bosses 16 and 17 which are provided with diametrically aligned internal bearings for the connecting rod wrist pin. The expander in its preferred form, as illustrated in Figures 1 to 4, comprises a resilient member 18 formed of flat metal stock and curved in a longitudinal plane, as viewed in Figure 3, and appearing in such plane as a general concavo-convex member. The opposite longitudinal end portions 19 and 21 of the member, that is the portions at the opposite ends of the aforementioned plane, are preferably formed with a reverse curve from the center body portion 22 of the member, so as to bevel outwardly from the curve of the body portion 22. With reference to Figure 3 of the drawings, the concavo-convex depth of the member, that is the distance between the center 22 of the body portion and a line intersecting the free ends 19 and 21 of the member, is somewhat greater in the unstressed neutral position of the member than the normal circular depth of the piston between a portion 23 of the skirt circumferentially intermediate the bosses 16 and 17 and a chord intersecting the skirt wall at the surface of the bosses nearest to the skirt part 23. On the other hand, the distance between the ends 19 and 21 in the normal unstressed position of the member is somewhat less than the length of said chord. Thus in this installed position in the piston, the member does not exactly follow the circular form of the skirt wall between the bosses but rather curves inwardly away from the wall at opposite sides of the center portion 22 and then curves back towards the wall on the reversely curved end portions to engage against the bosses. In installing the expander into the piston, the end portions 19 and 21 are resiliently sprung apart, as by means of suitable pliers or the like, and held apart so as to lessen the concavo-convex depth of the member sufficiently to enable the insertion of the member through the open bottom end 24 of the piston into position illustrated in Figures 1 to 3, that is with the center portion 22 of the body of the expander in engagement with the skirt part 23 and the free ends 19 and 21 of the expander in engagement with the bosses 16 and 17. The expander when released in such position will tend to return to its neutral form and the ends 19 and 21 will bear forcibly against the bosses in an inward direction while the part 22 is crowded outwardly against the skirt part 23. The operation of the present device and the method of expanding the piston herein used is substantially the reverse than in the case of former expanders of this general type. In the present case the ends of the expander are spread to effect the insertion of the expander and the resultant forces against the bosses are inward, whereas in former devices the ends have been contracted together to enable insertion of the device and the resultant forces on the bosses was outward. The action of the expander is best seen from the illustration in Figure 5 wherein the neutral unstressed position of the expander is shown in dotted lines 26 and the stressed inserted position of the expander is shown in full lines 27. The force exerted by the ends against the bosses is illustrated by vectors 28 and 29 which as will be noted are directed inwardly at an angle of approximately forty-five degrees to the axis 31 of the wrist pin bearings. The force exerted by the expander part 22 against the skirt wall 23 is illustrated by the force vector 23 which, as will be noted, is at substantially right angles to the axis 31. The interiorly directed forces at the ends of the expander, as illustrated by the vectors 28 and 29, provide substantial radial components and operate to contract the diametrical distance between the bosses 16 and 17. The contraction of the piston along the axis of the wrist pin bosses makes available a ready elongation of the diametrical dimension at right angles to this axis, with the result that the piston may be readily distorted into an oval shape with a minimum amount of resilient force. Accordingly, the expanding member 18 may be formed of relatively small size and light weight stock and by reason of the general conformity of the shape of the member with the interior circumference of the piston, the member is completely removed from the connecting rod of the piston and offers no possibility of interference therewith.

Pistons of the type herein illustrated are generally formed with an interior bead or re-enforcing flange 33 around the open end thereof and in the present case this bead operates as a stop for the lower edge 34 of the expander to positively lock the expander in position in the piston. Other pistons with which the expander may be used are formed with an interior reenforcing rib which extends circumferentially around the inside wall of the skirt at approximately the center of the bosses. To accommodate the present expander to this type of piston and also to better distribute the expanding force of the expander, the member 18 is provided with a central longitudinal slot 36 which in the case of such pistons, straddles the rib and co-acts with the rib to lock the expander in place. The longitudinal sides 37 and 38 of the slot 36 are preferably bowed upwardly and downwardly respectively, as viewed in Figure 1, so as to engage the skirt adjacent the ring retaining portion thereof and adjacent the open end thereof, whereby a complete and uniform expansion of the skirt over its full longitudinal dimension is provided. As will also be understood, the shape of the member 18 provides a full yieldably resilient construction which enables the piston to change its form during reciprocation to closely conform to the varying diameters of the worn cylinder wall. Also the drawing inwardly of the bosses instead of the outward displacement of the bosses as heretofore, maintains an improved alignment of the bearing axes than has been heretofore obtainable. It will further be noted that the resilience of the expander and yieldable change of form thereof is provided entirely in the expander shape itself and in changing form there is no rubbing or movement of the expander against any of the piston parts. Accordingly frictional resistance and wear from this source is completely obviated. While the present device is particularly effective with solid skirt types of pistons, the same operates with equal effectiveness in the case of slitted skirts either of the T-slot or U-slot types. In such instances the piston skirt is slitted to permit a more ready expansion of the skirt portion intermediate the bosses and in the use of the present device a greater area and amount of expansion is produced as compared to ordinary slit skirt types of expanders which generally operate directly in the slit of the skirt.

A modified form of the invention has been illustrated in Figure 6 of the drawings, wherein the expander device is formed of a single length of resilient wire 39 which is fashioned to conform to the general outline of the flat stock type of expander illustrated in Figures 1 to 4. The operation of this wire expander is in substantially all details similar to the form of the invention above described.

Figure 8:
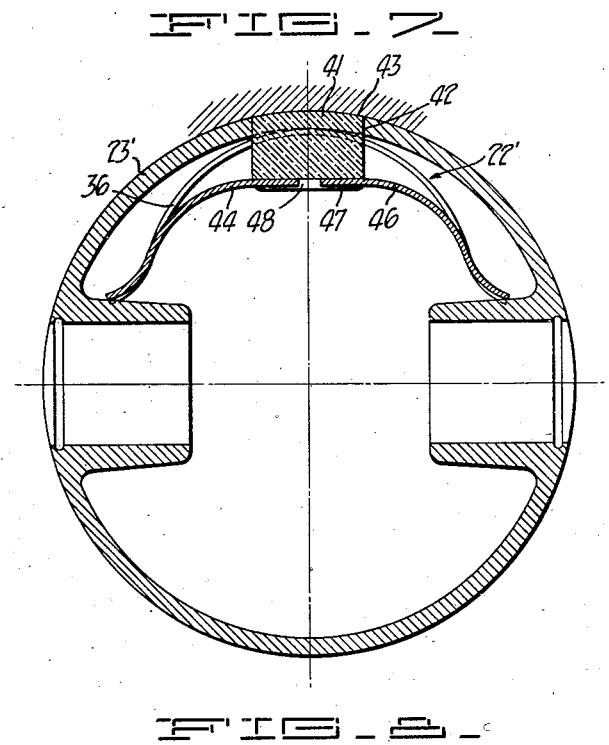
Figure 8 is a transverse sectional view of a piston and expander taken on the line 8—8 of Figure 7.

In the form of the invention illustrated in Figures 7 and 8 the expander device of the character above described is operatively combined with a movable piston wall section or member 41 to provide a new and novel result, viz. the combined distortion of the piston skirt and the simultaneous displacement of a piston wall member against the cylinder wall. Substantially any form of movable piston wall section may be used in the present invention, although as here shown and as preferred, the section is composed of a substantially cylindrical plug of dense hard wood and is mounted in a generally circular opening 42 in the skirt wall part 23' of the piston. The outer face 43 of the plug is preferably rounded or curved to conform with the cylindrical shape of the cylinder wall with which it is engaged and if desired, though not here shown, the plug may be formed with a shoulder for engagement with the inner surface of the skirt for limiting the outward expansion of the plug.

Means for urging the wall section 41 to an outwardly extended position here consists of a pair of spring tongues 44 and 46 pressed out from the center body portion 22' of the expander and may be composed from material otherwise blanked out in the forming of the central slot 36 of the preferred embodiment. These tongues engage the inner end 47 of the plug to urge the outward expansion of the plug while the remainder of the expander member, which is here formed substantially in accordance with the first embodiment, performs the piston expanding and distorting function as above described. In this manner an expansion and distortion of the piston is obtained simultaneous with the outward displacement of the wall section 41. While various resilient means have been used for outwardly urging a wall section of the character here used, no one to my knowledge has ever obtained a combined expansion of the piston as here provided, nor to my knowledge has anyone ever utilized the wrist pin bosses of the piston as an anchorage or support for the resilient means used to actuate the piston wall section. If desired and as here shown, the inner plug surface 47 is recessed as at 48 to receive the tongues 44 and 46 whereby an interlock is provided between the plug and the tongues and rotation of the plug relative to the piston prevented.

I claim:

1. A piston distorting means comprising, a flat resilient metal member having a generally segmental cylindrical form and adapted for resilient separation of the opposite cylindrical ends of the member for insertion into a piston for engagement of said ends with the piston bosses and formed with a centrally positioned circumferentially extending open portion, the portions of the member at opposite longitudinal sides of said open portion being bowed away from each other.

2. An expander for a hollow substantially cylindrical piston having oppositely disposed inwardly directed wrist pin bosses and a thrust wall, comprising an element of substantially U-shape for disposal in said piston with its intermediate portion engaging said thrust wall and each end in engagement with one of said bosses, said U-shaped element being open through the body thereof to provide an exposed internal edge within the body thereof in proximity to each end of said element and capable of engagement by a spreading tool.

3. A piston expander comprising a resilient element of substantially U-shape including an intermediate trough section and oppositely disposed legs extending therefrom, said trough section having a rib-accommodating portion transversely thereof for interlocking with a circular rib within the skirt of a piston when installed therein.

CHARLES F. JOHNSTON.